Oct. 12, 1954     M. G. SCHEIDER ET AL     2,691,497
COMBINED AIRCRAFT HULL AND WATER RUDDER
Filed April 10, 1951     4 Sheets-Sheet 1

INVENTORS
MAURICE G. SCHEIDER,
IRVIN E. KASS,

BY

ATTORNEY

Oct. 12, 1954  M. G. SCHEIDER ET AL  2,691,497
COMBINED AIRCRAFT HULL AND WATER RUDDER
Filed April 10, 1951                          4 Sheets-Sheet 2
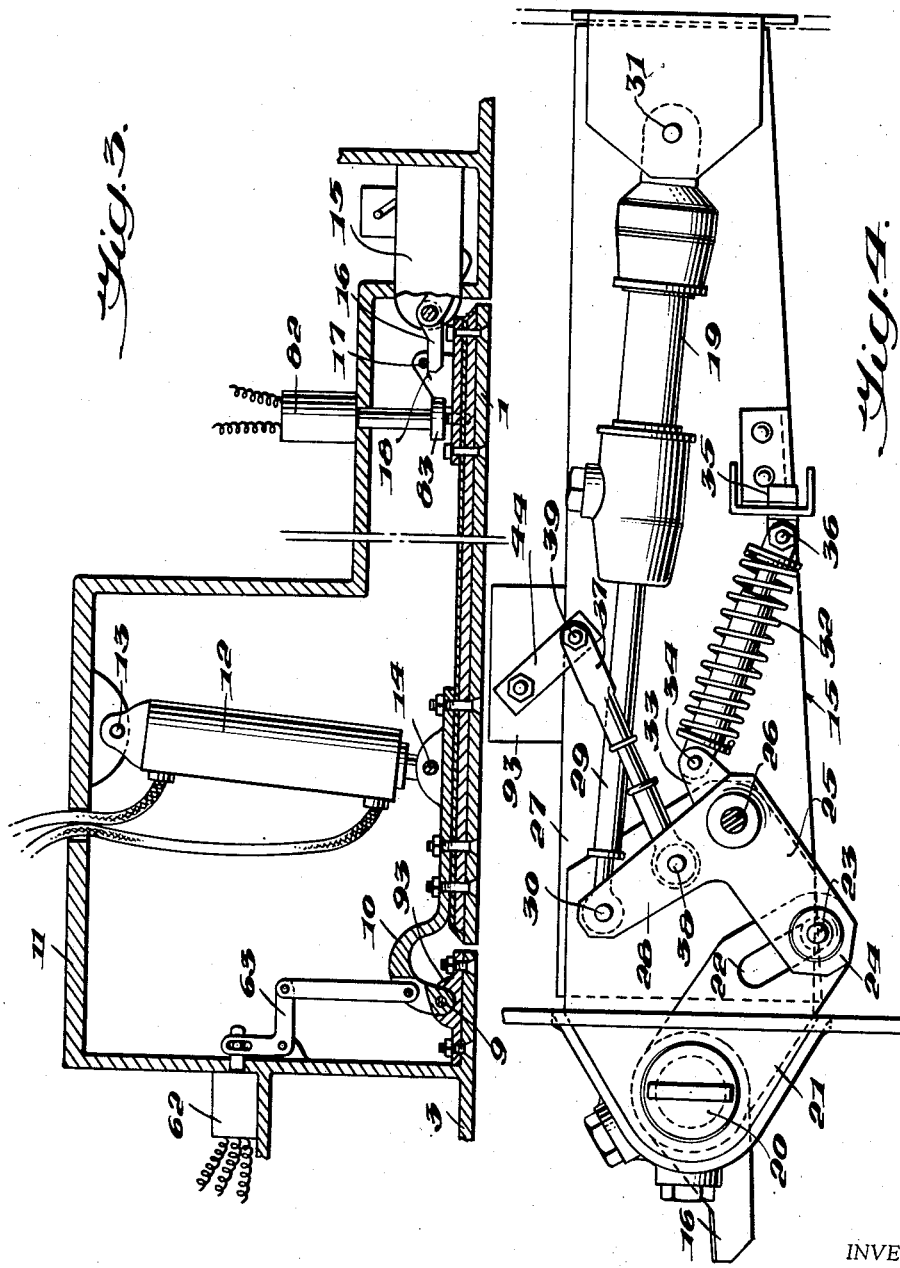
INVENTORS
MAURICE G. SCHEIDER,
IRVIN E. KASS,
BY *Martin E. Hogan Jr.*
ATTORNEY Oct. 12, 1954   M. G. SCHEIDER ET AL   2,691,497
COMBINED AIRCRAFT HULL AND WATER RUDDER
Filed April 10, 1951   4 Sheets-Sheet 3
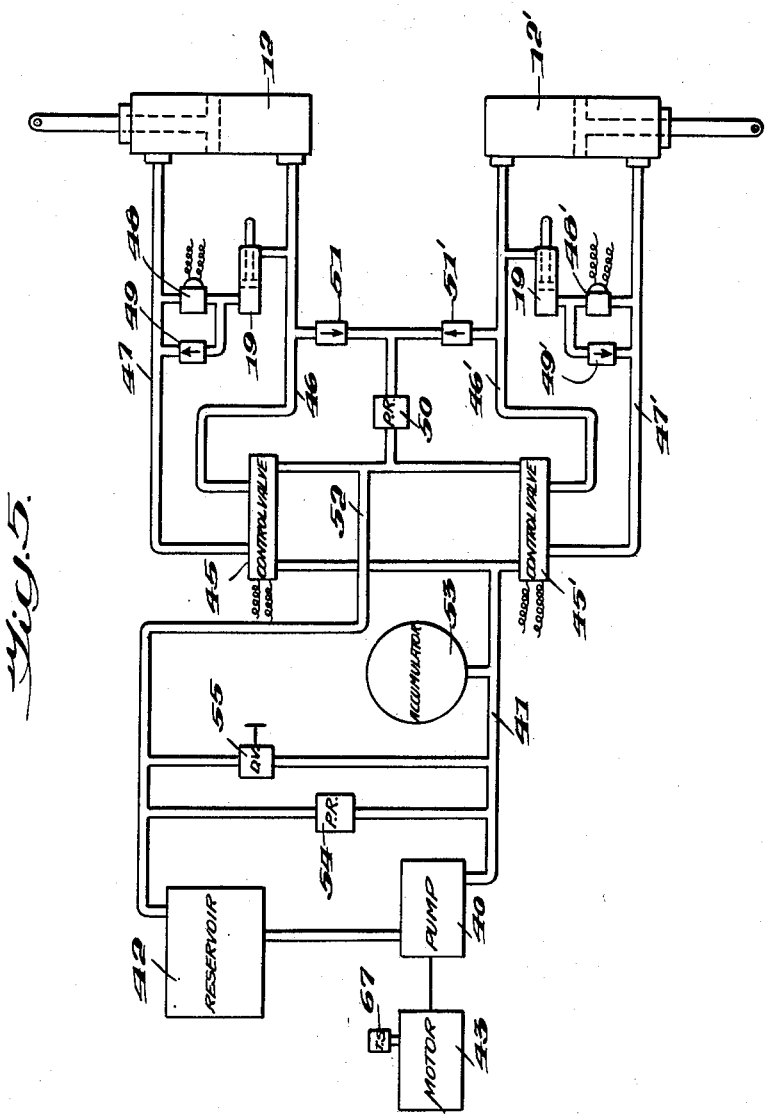
INVENTORS
MAURICE G. SCHEIDER,
IRVIN E. KASS,
BY
ATTORNEY

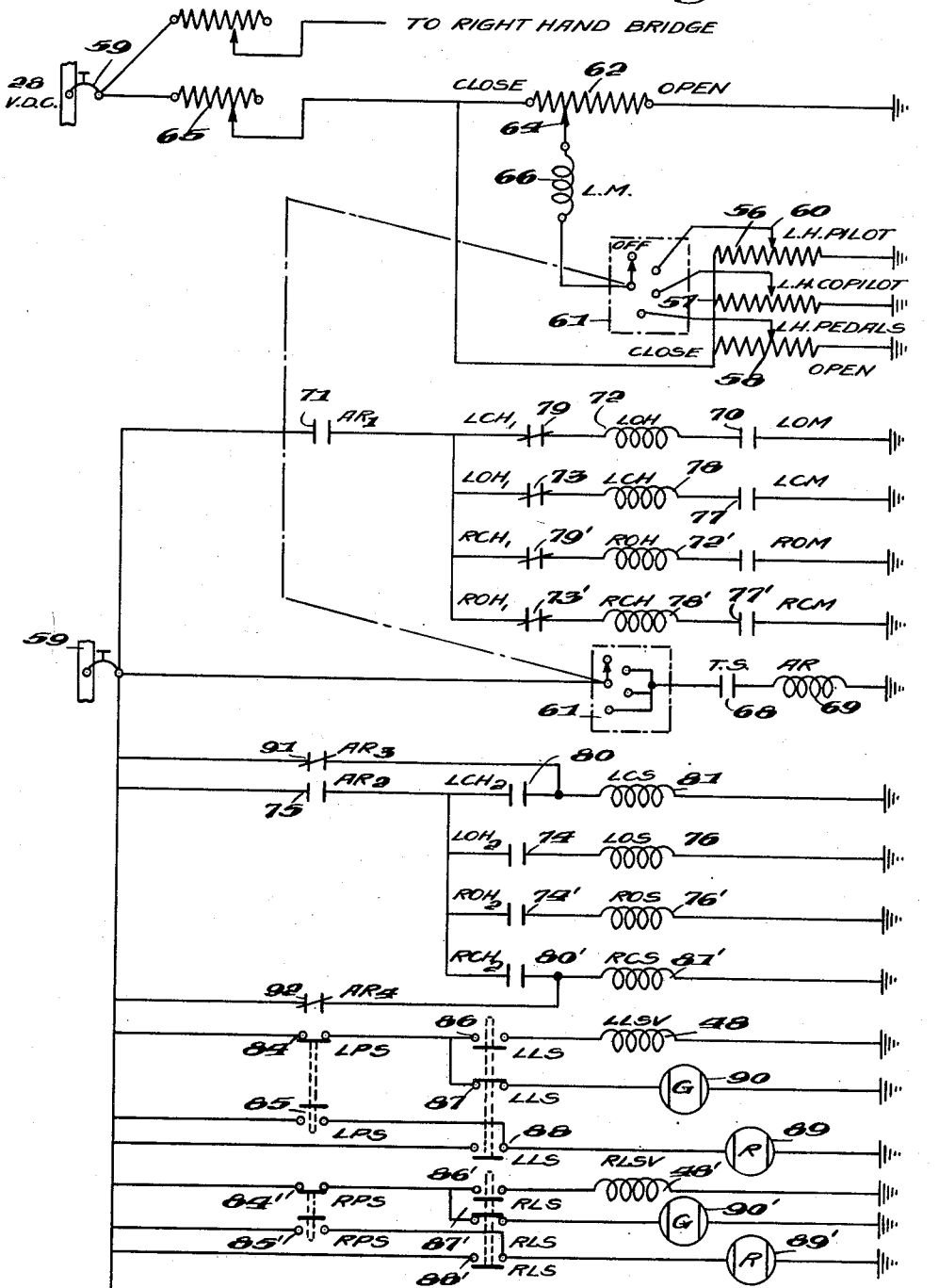

Patented Oct. 12, 1954

2,691,497

UNITED STATES PATENT OFFICE 2,691,497

COMBINED AIRCRAFT HULL AND WATER RUDDER

Maurice G. Scheider and Irvin E. Kass, Baltimore County, Md., assignors to The Glenn L. Martin Company, Middle River, Md., a corporation of Maryland Application April 10, 1951, Serial No. 220,206

9 Claims. (Cl. 244—112)

This invention relates to a water rudder and brake particularly adapted for flying boats.

To a great extent, the utility of a seaplane is dependent upon its ability to operate from small bodies of water and in congested areas such as around moorings and docks. The ineffectiveness of the aerodynamic control surfaces at relatively low speeds and the high drag of the hull in the water prevents attaining the necessary maneuverability of such craft without the use of special hydrodynamic control devices. This is particularly true of the larger flying boats and those employing the long afterbody hull such as the type shown in the drawings because of the greater area of water contact by the hull bottom.

To provide more effective water maneuverability, numerous devices have been proposed in the past. None of these prior art devices however, have proven satisfactory for producing high turning or yawing moments without adversely affecting the longitudinal stability or imposing high weight and aerodynamic drag penalties on the aircraft. Obviously, these features are of utmost importance to the efficient design of any flying boat.

An object of this invention is to provide a water rudder which completes the contour of the hull when in stowed position and thereby minimizes the aerodynamic drag of the aircraft. The rudder forming a part of the hull when closed also results in a considerable savings in weight since it serves as a portion of the outer skin and supporting structure.

Another object of this invention is to provide a water rudder which is operable to produce powerful yawing moments for turning the aircraft without adversely affecting its longitudinal stability.

Another object of this invention is to provide a water rudder which will also function as a brake and which is adapted for use in relatively shallow water.

Still another object of this invention is to provide a fluid actuated locking mechanism for the water rudder which will pull the rudder into closed position and automatically lock to prevent rudder movement in the event of a failure in the control system.

A further object of this invention is to provide a control system for operating the water rudder which will prevent damage due to excessive water loads.

Further and other objects will become apparent from the accompanying description and drawings which form a part of this disclosure and in which like numerals refer to like parts.

Figure 3 is a schematic longitudinal sectional view of the water rudder taken generally normal to the plane of the rudder.

Figure 4 is a fragmentary sectional side view of the locking mechanism.

Figure 5 is a schematic diagram of the hydraulic actuating system.

Figure 6 is a schematic diagram of the electrical control circuit.

Figure 1:
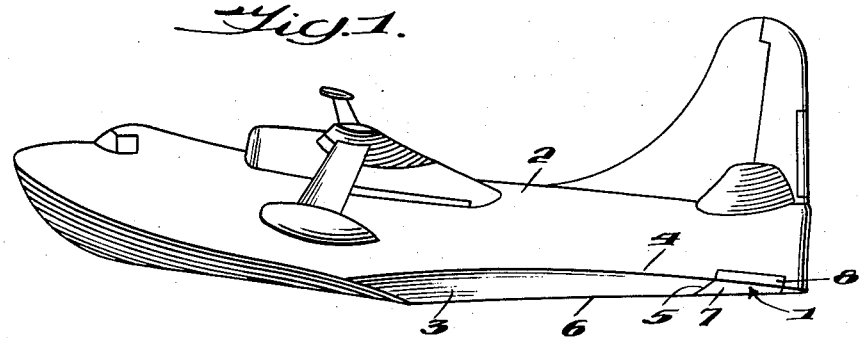
Figure 1 is a side view of a flying boat showing the rudder of this invention in closed position.
Figure 2:
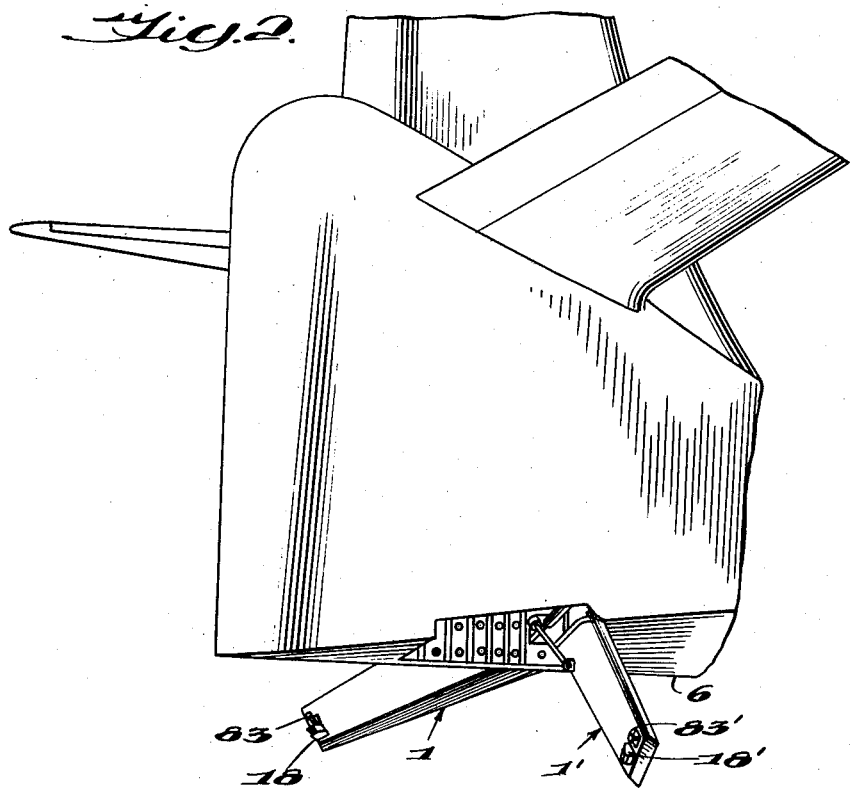
Figure 2 is a perspective view of the rearward portion of the flying boat showing the rudder of this invention in its fully open position.

The water rudder 1 of this invention is shown on a flying boat in Figure 1. It will be noted from this figure that water rudder 1 is located on the aft portion of the sloping hull bottom 3 and includes a portion of the hull above the chine 4. Rudder 1 is hinged at its canted forward edge 5, so that the hinge line about which the rudder is adapted to pivot slopes from the chine 4 downwardly and forwardly to the keel 6 in a plane substantially parallel with the plane of the hull bottom. This hinge line location allows the rudder to swing laterally into a generally vertical plane as shown in Figure 2, thus substantially eliminating any adverse pitching moments about the aircraft center of gravity. The primary surface 7 of rudder 1 comprises a portion of the hull bottom from the keel to the chine and the secondary surface 8, a portion of the hull above the chine. These two surfaces 7 and 8 produce counter-acting pitching moments which tend to balance out at small rudder deflections. That is, during the initial movements of the rudder, primary surface 7 produces a nose down pitching moment and the secondary surface 8 produces a counter-acting nose up pitching moment. As rudder 1 opens further, the primary surface 7 approaches a generally vertical plane, and the secondary surface 8, formed by the portion above the chine, approaches a horizontal plane parallel to the longitudinal center line of the aircraft. Thus for all positions of the rudder, adverse pitching moments are substantially eliminated.

The amount that the hinge line is canted is obviously quite important to the success of this rudder. It must be such that the primary rudder surface lies in a substantially vertical plane when in the normal operating positions. The amount of this canting is determined by several factors such as by the slope of the hull bottom and by the extended position at which the rudder is designed to operate.

As shown in Figure 2, the complete installation includes a left and right rudder, one on each side of keel 6, so that yawing moments in either direction can be produced and by swinging the rudders both open a braking action can also be obtained. By operating the rudders individually, braking and turning can be effected simultaneously. Both left and right rudders are similar, therefore, a description of one serves for both. However, in order to distinguish the two, primes are used with the identifying numbers when referring to the right rudder.

As shown in Figure 3, rudder 1 is adapted to pivot about the hinge pin 9, the center line of which represents the hinge line, through hinge 10 which is connected to a bracket 93 secured to the hull bottom 3 forming a part of the aircraft structure. Box-like housing 11 provides a watertight enclosure to prevent water from entering the hull when rudder 1 is in its extended position. Hydraulic cylinder 12 pivoted at 13 to structure 11 rigid with the aircraft, provides the force for positioning the rudder. The piston end of cylinder 12 pivotally connects with the rudder at 14. To lock rudder 1 in closed position, a locking mechanism 15 is provided mounted to the aircraft structure adjacent the rearward end of rudder 1. A swinging arm 16 on locking mechanism 15 is adapted to engage a pin 17 on bracket 18 rigid with rudder 1 and pull the rudder into closed position as shown in Figure 3. This allows the locking mechanism to relieve the strain on the hydraulic cylinder 12 during the last few degrees of movement of the rudder as it approaches the closed position and pull it tight against the hull structure to form a rigid part of the hull bottom.

Locking mechanism 15 is arranged so as to maintain the locked position without the aid of its hydraulic cylinder 19 shown connected to arm 16 through a linkage system in Figure 4. Arm 16 pivots about shaft 20 in accordance with the movement of lever 21 fixedly connected thereto. The free end of arm 21 is provided with a slotted opening 22 which engages a pin 23 on an arm 24 of bell crank 25. Bell crank 25 pivots about pin 26 fixed with respect to housing 27 of locking mechanism 15. The other arm 28 of bell crank 25 pivotally connects with piston rod 29 of cylinder 19 at pin 30. The opposite end of cylinder 19 is pinned to housing 27 at 31. By actuating cylinder 19, bell crank 25 is caused to pivot about pin 26 which in turn causes lever 21 to swing about the axis of shaft 20 to cause corresponding movement of arm 16. A compression spring 32 is pivotally connected at one end 34 to a bracket 33 on bell crank 25 and at its opposite end to a bracket 35, fixed with respect to housing 27, through pin 36. Compression spring 32 tends to maintain arm 16 in the locked and unlocked positions. When arm 16 has reached the locked position by actuation of hydraulic cylinder 19, the position of bell crank 25 is such that forces applied to arm 16 through pin 17 tending to open rudder 1 will not cause the mechanism to unlock. Only by actuating hydraulic cylinder 19 will the mechanism unlock the rudder.

Since the hydraulic cylinder 19 is controlled by a solenoid actuated hydraulic valve 48 as hereinafter described and shown in Figure 5, means must be provided to indicate to the control system when the locking mechanism is in its locked and unlocked positions. This means is provided by an arm 37 pinned at 38 to arm 28 of bell crank 25 so that it will move relative to the movement of the bell crank. The free end of arm 37 pivotally engages a second arm 44 through pin 39. Arm 44 swings in accordance with the movement of arm 37 to actuate locking solenoid switches 86, 87 and 88 located in switch box 93 for controlling solenoid valve 48 to allow fluid to flow to hydraulic cylinder 19.

The electro-hydraulic control system shown in Figures 5 and 6 for actuating water rudders 1 and 1' includes the controls for both rudders. In accordance with the description of the mechanical construction features, the corresponding components for the right hand rudder control components will be identified by adding primes to the identifying numerals given for the left hand control components. To further distinguish between the left and right hand components in the electrical circuit, the letters L or R are employed in Figure 6 where there are corresponding components for the left and right hand rudders.

The hydraulic system as shown schematically in Figure 5 includes a pump 40 for generating fluid pressure in the pressure line 41. A reservoir 42 communicating with pump 40 provides a container for storing an ample supply of fluid for the system. A motor 43 is used to drive pump 40. Pressure line 41 communicates with two solenoid control valves 45 and 45' which meter fluid independently into the respective actuating cylinders 12 and 12' and to the locking cylinders 19 and 19' to open and close the left and right hand water rudders. The rudder opening hydraulic lines 46 and 46' feed directly to actuating cylinders 12 and 12' and to locking cylinders 19 and 19'. The closing lines 47 and 47' communicate directly with their respective actuating cylinders 12 and 12' and with locking cylinders 19 and 19' through locking solenoid valves 48 and 48'. One-way check valves 49 and 49', by-passing the locking solenoid valves 48 and 48', provide a path through which fluid in locking cylinders 19 and 19' may pass for unlocking their respective water rudder without actuating the locking solenoid valve 48 or 48'. A pressure relief valve 50 communicates with hydraulic opening lines 46 and 46' through check valves 51 and 51'. A fluid return line 52 communicates with solenoid control valves 45 and 45' and with pressure relief valve 50 to provide a fluid passage to reservoir 42. An accumulator 53 is placed in pressure line 41 to provide smooth fluid flow through the control valves and to store up a limited amount of fluid pressure for use as hereinafter described. A second pressure relief valve 54 is interposed between the pressure line 41 and the return line 52 to prevent the build up of excessive pressures. A suitable valve such as a hand operated valve 55 is interposed between the pressure line 41 and the return line 52 for releasing the pressure from line 41 when the system is not in operation.

The electrical system employed to control the valves in the hydraulic system is shown schematically in Figure 6. The circuit is shown with the rudder closed and locked and with the pump motor 43 stopped. This electrical system incorporates a plurality of potentiometers arranged in Wheatstone bridge circuits for controlling each rudder independently. For purposes of simplicity, only one of these bridge circuits is shown complete in Figure 6, the bridge circuit for the right hand side being similar. To permit the pilot or co-pilot to control the water rudders selectively, several potentiometers may be arranged for use in each bridge circuit as shown in the drawing. Potentiometer 56 and 57, for example, are controlled by hand operation, one for the pilot and one for the co-pilot. The third control potentiometer 58 may be arranged to be operated by the movement of the pedals in the same manner that a pilot operates the brakes on an ordinary land plane. These arrangements in which the pilot and co-pilot may control the operation of the water rudder merely illustrate the flexibility of this type of control system. One end of each of these control potentiometers 56, 57, and 58 is fed to ground and the other ends are connected to the 28 volt supply source through circuit breaker 59. Each of the pick-offs as 60 of the control potentiometers 56, 57 and 58 are wired to a selector switch 61 so that the operator may select one of the three control potentiometers. Pickoffs 60 are moved relative to the ends of the particular potentiometer by the operator to control the position of the rudder. The other side of the bridge circuit is made up by a follow-up potentiometer 62. This follow-up potentiometer is operated by a follow-up linkage 63 connecting with rudder 1 as shown in Figure 3. The linkage 63 shown in Figure 3 is purely schematic and is intended to illustrate wherein the movement of the rudder will cause relative movement of pickoff 64 in Figure 6 for controlling the output from potentiometer 62. A variable resistor 65 is placed in the circuit between the power supply and the bridge so that the bridge may be adjusted to properly control the rudder movement. A sensitive relay or micro-positioner (LM) 66 is connected to the output of pick-off 64 and to the selector switch 61 to provide the bridge between the two potentiometers 62 and 56, 57 or 58. A torque switch 67 mounted on motor 43 as shown in Figure 5 is adapted to close the points 68 of its switch when the motor is running to cause the pump in the hydraulic line to build-up pressure, and to open when the motor is not operating. When the pressure has built-up in the hydraulic system by operation of motor 43, the torque switch points 68 will close and energize the action relay 69 which will change the position of all the action relay (AR) points shown in Figure 6.

When the bridge circuit becomes unbalanced, current will flow through the sensitive relay 66 in a certain direction depending upon the unbalance. To best describe the circuit and how it functions in the control system, it shall be supposed that the left hand rudder is being opened. Under this condition of operation, sensitive relay 66 will cause its left hand open points (LOM) 70 to close. Since the AR relay 69 is energized the AR₁ points 71 will close and complete a circuit to energize the left hand open slave relay (LOH) 72; thus the LOH₁ points 73 will open and the LOH₂ points 74 will close. The AR₂ points 75 of the energized AR relay 69 are closed to complete a circuit to energize the left hand opening solenoid (LOS) 76 which actuates the left hand control valve 45 in Figure 5 to allow fluid to pass through the opening line 46. The amount that the rudder swings open is of course controlled by the position of pick-off 60 on the particular potentiometers, 56, 57 or 58. When the bridge is balanced the left hand sensitive relay (LM) 66 is deenergized, causing the circuit to drop the LOS relay 76 and hold the rudder in that particular position.

To close the rudder, the pilot moves pick-off 60 of potentiometers 56, 57 or 58 to the "close" position indicated on the drawing, which unbalances the bridge and energizes the sensitive relay 66 and causes the left hand closing micro position relay points (LCM) 77 to close, thus energizing the left hand closing slave relay (LCH) 78. Left hand closing slave relay points (LCH₁) 79 are thereby opened and LCH₂ points 80 are closed to complete the circuit and energize the left hand closing solenoid (LCS) 81 to operate control valve 45 so that fluid will flow under pressure in the closing line 47, shown in Figure 5.

To aid hydraulic actuating cylinder 12 in closing rudder 1, means are provided for causing the locking mechanism 15 shown in Figure 3 to become actuated so that arm 16 will contact pin 17 and help move the rudder into the closed and locked position. As shown in Figure 3 this means includes a position switch 82 which is operated mechanically by contacting a seat 83 on rudder 1 as the rudder approaches the closed position. Actuation of this position switch 82 controls points (LPS) 84 and 85 shown in Figure 6. Arm 37 connecting with locking mechanism 15 as shown in Figure 4 controls the locking switches (LLS) 86, 87 and 88 to actuate them when rudder 1 is unlocked, and to return them to the position shown in Figure 6 when the rudder is again locked. Position switch 82 is actuated by the rudder moving out of contact with it in opening, causing LPS points 84 and 85 to change position and complete a circuit to cause a red indicating light 89 to become lighted, indicating that the rudder is unlocked. This circuit then remains the same until the rudder approaches its closed position, at which time seat 83 will again contact position switch 82 and actuate points 84 and 85 to move them into position shown in Figure 6. The locking solenoid switch (LLS) points 86, 87 and 88 having been actuated when locking mechanism 15 becomes unlocked, points 86 and 88 are in closed position and point 87 is in open position. Point 87 operates a green light 90 to indicate that the rudder is closed and locked. Therefore, after the positioning switch 82 has closed points 84, due to contacting seat 83 on the rudder 1 as it approaches the closed position, the left hand locking solenoid valve (LLSP) 48 is actuated to allow fluid to flow into locking cylinder 19 from the pressure line 47 as shown in Figure 5. This flow of fluid causes arm 16, shown in Figure 3, to swing inward and help close the rudder. When locking mechanism 15 has moved up into locked position, arm 37 causes the locking switches 86, 87 and 88 to change their position, thus deenergizing the locking solenoid valve 48 and completing a circuit to the green indicating light 90 to indicate that the rudder is closed and locked. Under this condition, the points 88 and 85 are both open and the red light 89 is out.

In case motor 43, which drives pump 40 in the hydraulic system, stops operating, points 68 in torque switch 67 immediately open and drop the AR relay 69 irrespective of the position of the rudders. Thus it is seen that when this occurs, the AR₃ relay points 91 and the AR₄ points 92 close, by-passing AR₂ points 75 and slave relay points 80, 80', 74 and 74' in the circuit, and immediately energize the left and right hand closing relays LCS and RCS to close the rudders. Sufficient pressure to accomplish this after the pump stops is provided by the accumulator 53 in the hydraulic pressure line shown in Figure 5.

As rudder 1 is being opened, by allowing hydraulic fluid to flow through control valve 45 and into cylinders 12 and 19 through line 46, the fluid in closing line 47 is allowed to pass back through the control valve and into line 52 communicating with reservoir 42. Check valve 49 allows the fluid to escape from cylinder 19 to unlock locking mechanism 15 even though solenoid valve 48 is closed. If excessive loads are applied to the rudder while it is being opened or while it is being closed, pressure relief valve 54 communicating with pressure line 41 and return line 52 will open and allow the fluid to flow into reservoir chamber 42 instead of into the actuating cylinder through control valve 45. This therefore allows the rudder to stop moving outwardly and assume a position which will not over-stress it. However, when the rudder is in a stationary extended position there is no fluid communication between lines 46 and 47 and the return line 52 because control valve 45 is closed. Therefore in order to prevent damage due to overloading when in a stationary extended position, pressure relief valve 50 is located in return line 52 so that fluid will be allowed to flow into the reservoir chamber from the actuating cylinders thereby allowing the rudder to close sufficiently so as to prevent overstressing. One-way valves 51 and 51' are interposed between pressure relief valve 50 and opening lines 46 and 46' to prevent fluid from flowing into the left hand rubber opening line from the right hand rudder opening line and vice versa due to overloading.

To actuate rudders 1 and 1', the operator first selects the particular potentiometer 56, 57 or 58, which he chooses to use for controlling each rudder, by means of selector switch 61. He then moves the pick-off 60 of the particular potentiometer selected to a position corresponding to the desired rudder deflection. This unbalances the bridge circuit and energizes the micro positioner relay 66 to control the solenoid actuated valve in the hydraulic circuit of the rudder for causing the proper flow of fluid in the manner described hereinabove. Any particular position of the pick-off 60 relative to its potentiometer represents a certain position of the water rudder. Thus by moving the pick-off to an extreme position, the water rudder fully opens or fully closes depending upon which direction the pick-off is moved. By moving the pick-off to an intermediate position, the rudder is opened to a corresponding position. In this manner powerful yawing moments are produced for steering the flying boat while on the water. By opening both the left hand and right hand rudders equally and together a pure braking and yawing action can be obtained simultaneously.

The rudder having a canted hinge line sloping forwardly from the chine to the keel in a plane substantially parallel to the plane of the hull bottom allows it to swing into a substantially vertical plane for its normal operating positions thereby minimizing the pitching moments about the aircraft's center of gravity. The secondary rudder surface 8 comprising a portion of the hull above the chine, tends to negative any nose-down pitching moments caused by primary surface 7 of the water rudder at small deflections by producing a nose-up pitching moment which substantially equalizes the nose-down pitching moments. Thus, the desired yawing moments are obtained for all rudder deflections without introducing forces causing adverse pitching moments which destabilize the aircraft.

Other advantages of the canted hinge line is also evident in Figure 2 wherein the deflected rudder projects substantially outwardly as opposed to downwardly and therefore in shallow water, the rudder can be operated without danger of being damaged by dragging on the bottom.

The water rudder completing the contour of the hull when in closed position minimizes the air drag when the craft is in flight and results in considerable weight savings over conventional devices used for the same purpose.

It is to be understood that certain changes, alterations, modifications and substitutions can be made without departing from the spirit and scope of the appended claims.

We claim as our invention:

1. A steering device for watercraft having a hull bottom with sides sloping inwardly and downwardly from the chine to the keel comprising, a rudder forming in retracted position a portion of said bottom between said chine and keel adjacent one end thereof, means connecting the forward end of said rudder to said bottom for swinging movement about a hinge axis, said hinge axis sloping forwardly from said chine to said keel in a plane substantially parallel with the plane of said bottom, said rudder being swingable outwardly and downwardly about said axis into an extended operative position wherein it lies substantially in a vertical plane whereby planing effects causing adverse pitching moments about the craft's center of gravity are minimized, means for deflecting said rudder to produce a turning moment, and locking means for holding said rudder in closed position to complete the contour of said hull bottom.

2. A directional control device for aircraft of the seaplane type having a hull bottom sloping downwardly and inwardly from the chine to the keel comprising, a pair of water rudders forming in retracted position a part of the rearward portion of said hull on either side of said keel, hinge means connecting the forward end of each said rudder to said hull bottom for swinging movement about a hinge line, said hinge line sloping forwardly from said chine to said keel in a plane generally parallel with the plane of said bottom, said rudders being swingable outwardly and downwardly about their respective hinge lines into extended operative positions wherein they lie in substantially vertical planes whereby to minimize adverse pitching moments about the aircraft's center of gravity, means for independently deflecting said water rudders, and means for locking said water rudders in position for completing the contour of said hull bottom.

3. A steering device for aircraft of the seaplane type having a hull bottom sloping downwardly and inwardly from the chine to the keel comprising, a rudder forming in retracted position a portion of said bottom between said chine and keel adjacent the rearward end, means connecting the forward end of said rudder to said bottom for swinging movement about a hinge axis, said hinge axis sloping forwardly from said chine to said keel in a plane substantially parallel to the plane of said sloping bottom, said rudder being swingable outwardly and downwardly about said axis into an extended operative position wherein it lies substantially in a vertical plane whereby planing effects causing adverse pitching moments about the aircraft center of gravity are minimized, means for deflecting said rudder for producing a yawing moment about the aircraft center of gravity for turning, and means for locking said rudder in position to complete the contour of said hull bottom.

4. A steering device for aircraft of the seaplane type having a hull sloping upwardly and outwardly from the keel to the chine, comprising a pair of water rudders forming in retracted position a part of said hull on either side of said keel, said water rudders each being hinged to pivot about a hinge line sloping forwardly from said chine to said keel in a plane substantially parallel with the plane of said hull bottom, said rudders being swingable outwardly and downwardly about their respective hinge lines into extended operative positions wherein they lie in substantially vertical planes whereby to minimize pitching moments tending to de-stabilize the aircraft while producing powerful yawing moments for directional control and braking action, and means for moving said rudders between retracted and extended positions.

5. A steering device for a watercraft having a laterally sloping hull bottom comprising, a water rudder forming in retracted position a portion of said hull bottom and adapted to swing about a hinge line located at the forward end thereof, said hinge line sloping downwardly and forwardly in a plane substantially parallel with said bottom, said rudder being swingable outwardly and downwardly about said hinge line into an extended operative position wherein it lies generally in a vertical plane, and means for swinging said rudder.

6. A steering device for watercraft having a hull bottom sloping inwardly and downwardly from the chine to the keel comprising, a water rudder forming in retracted position a portion of said hull bottom between said chine and keel, a canted hinge swingably connecting said rudder at its forward end with said hull bottom, the axis of said hinge slopping forwardly from said chine to said keel in a plane generally parallel with said hull bottom whereby said rudder swings generally outwardly and downwardly into operating position, actuating means connecting with said rudder for controlling its swinging movement, and a locking mechanism carried by said craft and adapted when rendered operative to assist said actuating means to pull said rudder into its retracted position completing the contour of said hull bottom and to hold it therein, and means responsive to approach of said rudder to said retracted position for rendering said locking mechanism operative.

7. A steering device for watercraft having a hull bottom sloping inwardly and downwardly from the chine to the keel comprising, a water rudder forming in retracted position a portion of said hull bottom between said chine and keel, a canted hinge swingably connecting said rudder at its forward end with said hull bottom, the axis of said hinge sloping forwardly from said chine to said keel in a plane generally parallel with said hull bottom whereby said rudder swings generally outwardly and downwardly, hydraulic actuating means carried by said hull and connecting with said rudder for causing said swinging movement, means carried by said craft and adapted to control said hydraulic actuating means for positioning said rudder, automatic overload relief means associated with said hydraulic actuating means adapted to limit the maximum load applied to said rudder, and a locking mechanism carried by said craft and responsive to rudder movement into its retracted position completing the contour of said hull bottom for locking said rudder in said retracted position independent of said actuating means.

8. A steering device for a seaplane having a hull bottom sloping downwardly and inwardly from the chine to the keel comprising, a pair of water rudders located on either side of said keel and adapted in retracted position to form a part of said hull bottom, means connecting the forward end of each of said rudders to said hull bottom for swinging movement about a hinge axis, said hinge axis sloping forwardly from said chine to said keel in a plane generally parallel to said sloping bottom whereby said rudders swing generally outwardly and downwardly and into a substantially vertical plane for the normal operating positions, control means connecting with said rudders for independently causing said swinging movement whereby to produce yawing moments for steering said seaplane, said control means including means adapted to automatically prevent said swinging movement when excessive loads are applied to said rudders, and means responsive to rudder movement for automatically locking said rudders in position forming a portion of said hull bottom.

9. A steering device for a seaplane having a hull including a bottom sloping downwardly and inwardly from the chine to the keel comprising a water rudder, said rudder having a secondary surface forming a portion of said hull above said chine and a primary surface forming a portion of said hull bottom between said chine and said keel, a canted hinge swingably connecting said rudder at its forward end with said hull, the axis of said hinge sloping forwardly from said chine to said keel in a plane generally parallel with said hull bottom whereby said rudder swings generally outwardly as opposed to downwardly, said primary and secondary rudder surfaces producing counteracting pitching moments and co-acting yawing moments, means connecting with said rudder and carried by said hull controlling said swinging movement for steering said seaplane, and including overload relief means limiting the load on said rudder, and means carried by said hull and responsive to rudder movement for automatically locking said rudder in position completing the contour of said hull.

References Cited in the file of this patent

UNITED STATES PATENTS

| Number | Name | Date |
| --- | --- | --- |
| 557,052 | Cole | Mar. 24, 1896 |
| 2,347,841 | Parker | May 2, 1944 |
| 2,461,967 | Devlin | Feb. 15, 1949 |

FOREIGN PATENTS

| Number | Country | Date |
| --- | --- | --- |
| 13,886 | Great Britain | of 1893 |
| 294,713 | Great Britain | Aug. 2, 1928 |
| 581,736 | Great Britain | Oct. 23, 1946 |
| 754,814 | France | Aug. 28, 1933 |
| 811,040 | France | Jan. 9, 1937 |
| 946,196 | France | Dec. 13, 1948 |